United States Patent
Sanders

(10) Patent No.: US 6,648,131 B2
(45) Date of Patent: Nov. 18, 2003

(54) FLEXIBLE PRESSURE VESSEL, APPARATUS AND METHOD FOR MAKING SAME

(76) Inventor: Stan A. Sanders, 16510 Blenham Way, Chesterfield, MO (US) 63005

(*) Notice: Subject to any disclaimer, the term of this patent is extended or adjusted under 35 U.S.C. 154(b) by 289 days.

(21) Appl. No.: 09/864,521

(22) Filed: May 23, 2001

(65) Prior Publication Data

US 2002/0175088 A1 Nov. 28, 2002

(51) Int. Cl.⁷ ................................ B65B 3/00
(52) U.S. Cl. .................. 206/6; 206/484; 383/38; 220/560.13
(58) Field of Search .............. 206/0.6, 0.7, 484, 206/484.2, 461, 522; 383/38; 220/560.13, 584, 592

(56) References Cited

U.S. PATENT DOCUMENTS

| | | | | |
|---|---|---|---|---|
| 3,410,392 A | * | 11/1968 | Hermanson | 206/205 |
| 4,096,306 A | * | 6/1978 | Larson | 428/192 |
| 5,924,392 A | * | 7/1999 | Hall | 122/494 |

* cited by examiner

Primary Examiner—Mickey Yu
Assistant Examiner—Troy Arnold
(74) Attorney, Agent, or Firm—David A. Belasco; Belasco Jacobs & Townsley, LLP

(57) ABSTRACT

A flexible pressure vessel is constructed from at least one pair of upper and mating lower dome shaped cell portions. The dome portions are molded from sheets of resilient material and joined together by radio frequency welding or high-strength adhesives. Upper and lower passageway portions extend outwardly from each cell portion to the surrounding sheet material. When the cell portions are joined the passageway portions are joined to form a passageway for connection to a valve or another cell. Upper and lower rings surround the upper and lower cell portions to provide reinforcement for the cells. First and second blankets of heavy-duty fiber reinforced material are attached over the upper and lower cell portions and stitched in place with heavy-duty stitching extending through the resilient material surrounding the cell portions. Cell shaped sponges impregnated with absorbent materials are encased in liquid and gas impermeable plastic tubing and inserted into the cells prior to joining of the cell portions. Heat-reflecting plastic film or metal foil is inserted between blankets and the cell portions. The heavy duty stitching is high-pressure loop and lock braiding. The passageway has a cross-section of between 0.050 and 0.100 inches. An apparatus and method are described for constructing the flexible pressure vessel.

29 Claims, 7 Drawing Sheets

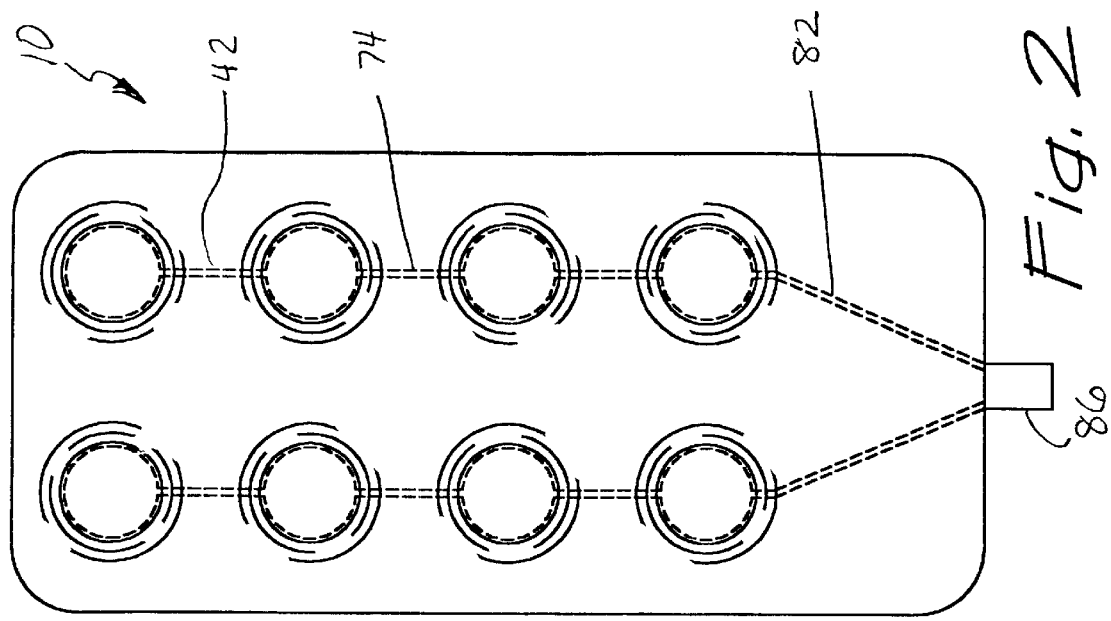
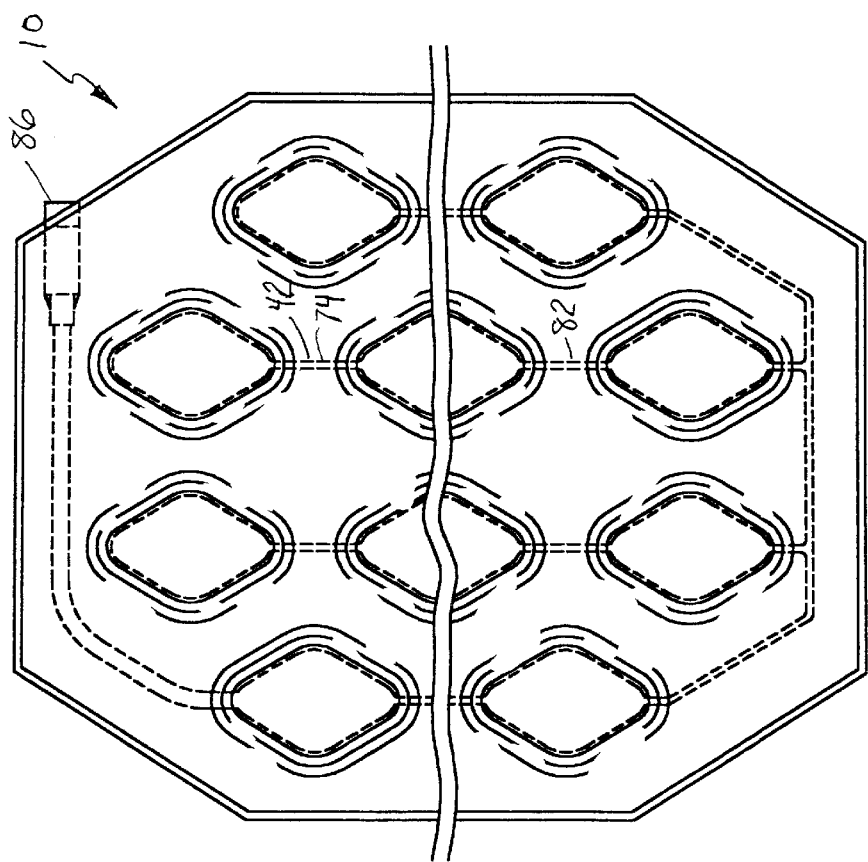

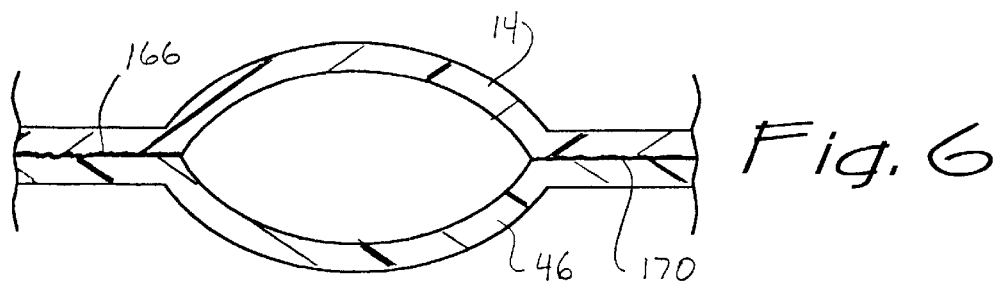
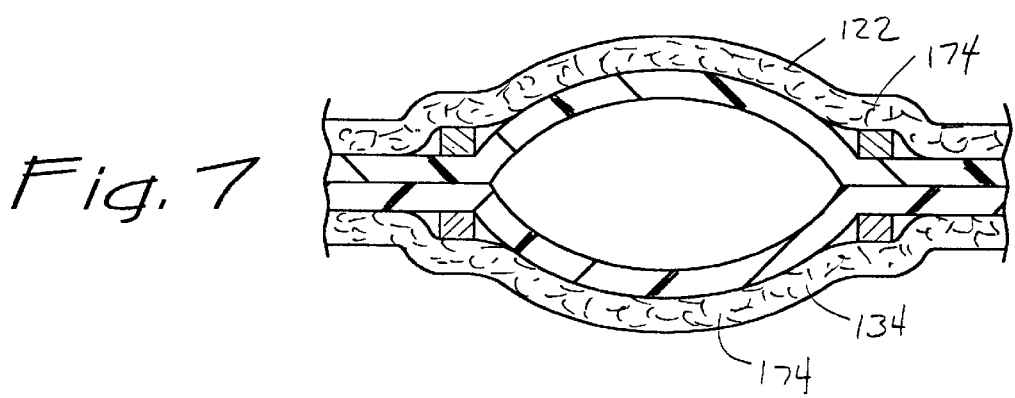
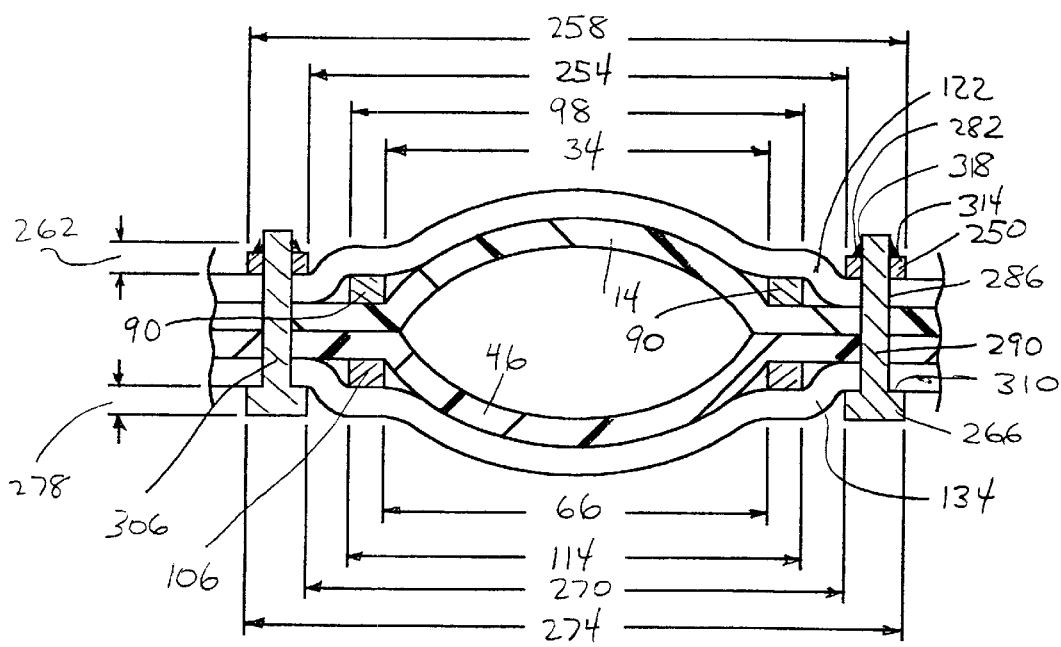

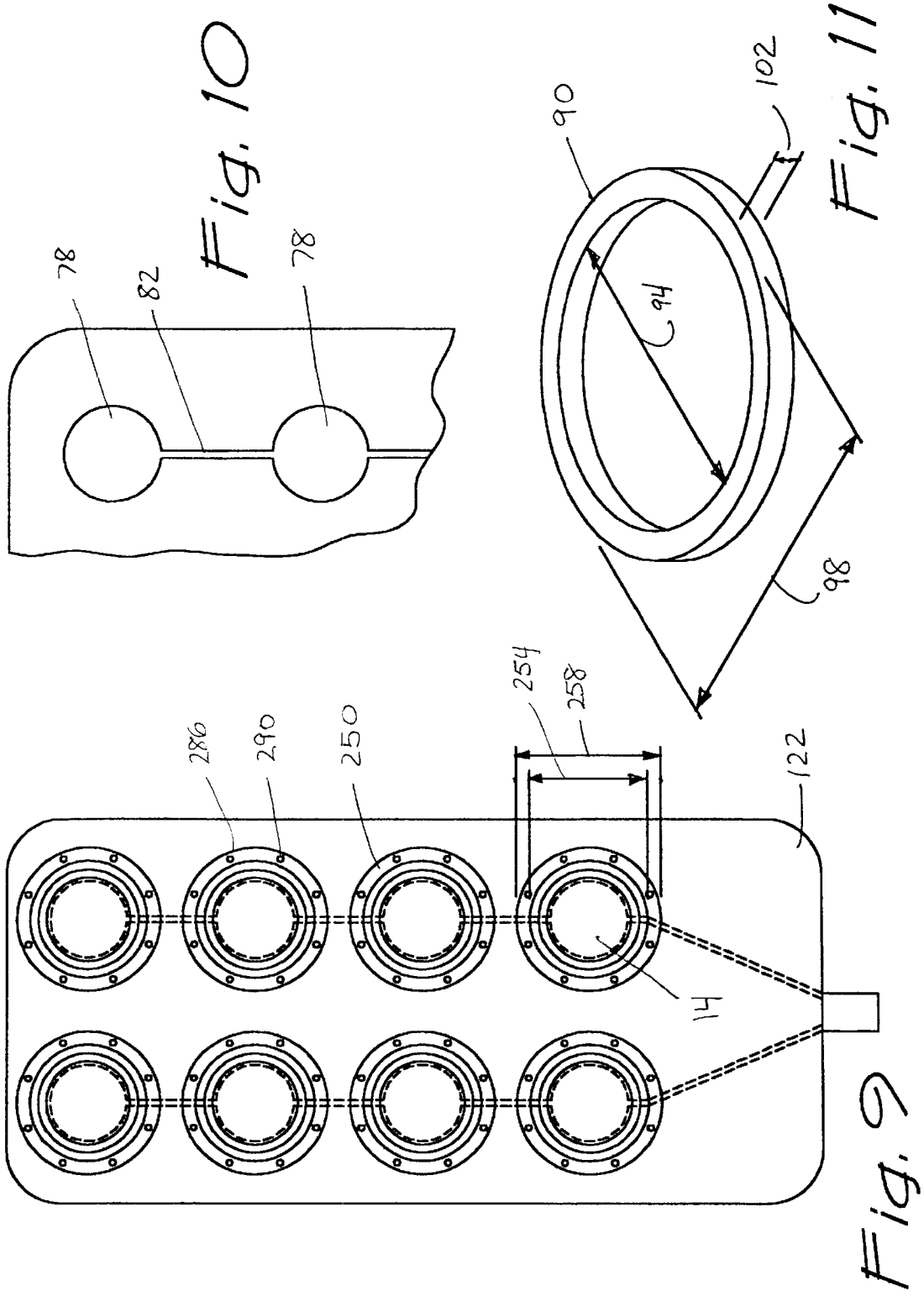

FLEXIBLE PRESSURE VESSEL, APPARATUS AND METHOD FOR MAKING SAME

FIELD OF INVENTION

The invention pertains to devices for storing gases and fluids under pressure. More particularly, the invention relates to pressure vessels that are formed out of flexible materials and that can be made to conform to a variety of shapes.

BACKGROUND OF THE INVENTION

Typically, pressure vessels capable of containing liquids or gases at significant pressures have involved fixed shape cylinders or spheres formed of high-strength metals such as steel or aluminum. Such pressure vessels, while successful for their designed applications, involve a number of problems. First, such metallic cylinders are relatively heavy compared to the gases fluids that they contain. Second, pressure cylinders contain all of the gas or liquid in a single space. Should the vessel rupture, the entire vessel is destroyed, often with a violent explosion sending shards of metal in all directions. Third, metallic cylinders have a definite shape and cannot be adapted to fit readily in many space-constrained applications. The present invention involves a number of small cells linked to each other by small conduits. The cells are collected in a flexible matting material that adds to the structural integrity of the cells. A pressure vessel of this type can be lightweight, adaptable to a variety of spaces and unusual applications, and is inherently safer in rupture situations.

Various designs have been developed using linked cell technologies, most in the area of packaging materials. U.S. Pat. No. 4,551,379 issued to Kerr discloses heat-sealable packaging material comprised of interconnected cells formed by laminating two facing sheets of air impermeable material to define designated partitions and passageways. Discontinuities are provided at selected locations in each of the partitions to provide limited communication between the adjacent passages. The packaging material may be cut to the desired length and sealed at one end and then inflated by the insertion of a suitable manifold at the other end and supplying pressurized air. While inflation is maintained, the passages are sealed by a heat-sealing bar trapping the air within the passages.

U.S. Pat. No. 4,096,306 issued to Larson, describes air inflated cushioning material comprising a series of interconnected cells formed by heat-sealing two facing sheets of film together. Here the cells are connected to each other and a central passageway that is used to inflate the cells. After inflation, the entrance to the passageway is then sealed.

U.S. Pat. No. 4,465,188, issued to Soroka et al., is directed to an inflatable packaging structure that includes an envelope with an inner liner. The inner liner located within envelope includes an inflatable first layer and a second or upper inflatable layer formed of flexible sheets of heat sealable plastic material. The sheets are sealed to form zones that are connected to a single valve used for inflation.

U.S. Pat. No. 5,267,646 issued to Inoue et al. describes containers formed of laminated, interconnected cells. The cells are arranged in pairs that can communicate with each other. One chamber is designed to hold powdered, liquid or solid preparations while the second chamber is designed to hold an oxygen absorbent and a desiccant.

U.S. Pat. No. 5,824,392 issued to Gotoh et al., is directed to a method and apparatus for producing an air cushion having a plurality of independent bubbles. The bubbles have communicating portions extending in a continuous direction so that a plurality of them may be filled simultaneously and then individually sealed. A sheet of bubbles is formed by heat-sealing films together having the bubble forming depressions shapes with a hollow tubing communicating portion extending at the center line of the films in a continuous direction. A portion corresponding to the bubble forming depressions communicates with the right and left sides of the communicating portion. Air blown from a nozzle and fed through the communicating portion inflates the bubbles so that the films can be sealed at the communicating conjunction area making each bubble independent.

While other variations exist, the above-described designs involving linked cell technologies are typical of those encountered in the prior art. It is an objective of the present invention to provide a flexible pressure vessel that is capable of maintaining gasses or liquids at relatively high pressures. It is a further objective to provide this capability in a vessel that is light in weight and that presents a significantly reduced risk of injury in rupture situations. It is a still further objective of the invention to provide a pressure vessel that may be easily adapted to a variety of space constraints. It is yet a further objective to provide a pressure vessel that is durable, easily serviced, and that may be produced inexpensively.

While some of the objectives of the present invention are disclosed in the prior art, none of the inventions found include all of the requirements identified.

SUMMARY OF THE INVENTION

The present invention addresses many of the deficiencies of prior art flexible container and pressure vessel inventions and satisfies all of the objectives described above.

A flexible pressure vessel providing the desired features may be constructed from the following components. At least one upper dome-shaped cell portion is provided. The upper cell portion is formed from a first sheet of resilient material and has an inner surface, an outer surface, an inner perimeter, an outer perimeter, a border of sheet material surrounding the outer perimeter, and at least one upper passageway portion. The upper passageway portion extends outwardly from the inner perimeter to the surrounding sheet material.

At least one mating lower dome-shaped cell portion is provided. The lower cell portion is formed from a second sheet of resilient material and has an inner surface, an outer surface, an inner perimeter, an outer perimeter, a border of sheet material surrounding the outer perimeter, and at least one lower passageway portion. The lower passageway portion extends outwardly from the inner perimeter to the surrounding sheet material. The upper cell portion is joined to the mating lower cell portion such that a cell is formed. The cell has at least one passageway extending outwardly from the cell for connection to either a passageway of another cell or a valve.

A first ring is provided. The first ring has a first inner circumference, an outer circumference and a first predetermined thickness. The first ring is sized and shaped to fit frictionally over the upper cell portion and surround its outer perimeter. A second ring is provided. The second ring has a second inner circumference, an outer circumference and a second predetermined thickness. The ring second ring is sized and shaped to fit frictionally over the lower cell portion and surround its outer perimeter.

A first flexible blanket is provided. The first blanket has an upper surface, a lower surface and is sized and shaped to cover the upper cell portion and surrounding sheet material. The first blanket is fixedly attached at its lower surface to the outer surface of the upper cell portion and surrounding sheet material. A second flexible blanket is provided. The second blanket has an upper surface, a lower surface and is sized and shaped to cover the lower cell portion and surrounding sheet material. The second blanket is fixedly attached at its lower surface to the outer surface of the lower cell portion and surrounding sheet material. A valve is provided. The valve is connected to the passageway and provides means for controlling a flow of either of gasses and liquids into and out of the cell.

In a variant of the invention, heavy duty stitching is used to attach the first blanket to the second blanket. The stitching penetrates the first and second blankets and the first and second resilient sheets between the upper and lower cell portions and serves to prevent movement of the first and second rings with respect to the upper and lower cell portions.

In another variant, the heavy duty stitching is high-pressure hoop and lock braiding. In still another variant, a cell-shaped sponge is inserted between the upper cell portion and the lower cell portion prior to joining the upper and lower cell portions. The sponge serves to prevent the cell from collapsing after either of gas and liquid is removed from the cell. In yet another variant, the sponge is impregnated with a with a zeolite compound.

In yet a further variant of the invention, either a heat-reflecting plastic film or a metal foil is inserted between at least one of the first blanket and the upper cell portion or the second blanket and the lower cell portion.

In still a further variant, the upper cell portion is joined to the lower cell portion by either radio frequency welding or high strength adhesive. In another variant, either of the first and second blankets is formed of high-strength fiber impregnated material. In still another variant the passageway has a cross-section of between 0.050 and 0.100 inches.

In yet a further variant, the flexible pressure vessel includes an upper retaining plate. The upper retaining plate has a third inner circumference, an outer circumference and a third pre-determined thickness. The upper retaining plate is sized and shaped to fit over the upper cell portion and surround its outer perimeter when the upper cell portion is covered by the first blanket. The third inner circumference is larger than the outer circumference of the first ring.

A lower retaining plate is provided. The lower retaining plate has a fourth inner circumference, an outer circumference and a fourth pre-determined thickness. The lower retaining plate is sized and shaped to fit over the lower cell portion and surround its outer perimeter when the lower cell portion is covered by the second blanket. The fourth inner circumference is larger than the outer circumference of the second ring. Means are provided for attaching the upper retaining plate to the lower retaining plate. When the upper retaining plate is attached to the lower retaining plate, surrounding the upper and lower cell portions and the first and second blankets covering the first and second rings, the pressure capacity of the cell will be increased.

In still a further variant of the invention, the means for attaching the upper retaining plate to the lower retaining plate includes a series of holes. The holes penetrate the upper retaining plate between its outer circumference and the third inner circumference, the lower retaining plate between its outer circumference and the fourth inner circumference and the first blanket, the border of sheet material surrounding the outer perimeter of the upper cell portion, the border of sheet material surrounding the outer perimeter of the lower cell portion and the second blanket. The holes are outside of the outer circumference of the first and second rings.

A series of fastening means are provided. The fastening means are sized and shaped to pass through the series of holes and capable of securing the upper retaining plate to the lower retaining plate. In another variant, the fastening means is a series of bolts and locking nuts. In still another variant, the fastening means is a series of rivets.

In a further variant of the invention, the means for attaching the upper retaining plate to the lower retaining plate includes a series of holes. The holes penetrate the upper retaining plate between its outer circumference and the third inner circumference, the first blanket, the border of sheet material surrounding the outer perimeter of the upper cell portion, the border of sheet material surrounding the outer perimeter of the lower cell portion and the second blanket. The holes are outside of the outer circumference of the first and second rings.

A series of pins is provided. The pins are affixed orthogonally along an upper surface of the lower retaining plate and are sized, shaped and located to fit slidably through the series of holes and extending slightly above an upper surface of the upper retaining plate. A series of welds are used to fixedly attach the pins to the upper retaining plate, thereby securing the upper and lower retaining plates to each other.

In still another variant, a series of cell shaped sponges is provided. A tube is provided. The tube is formed of flexible, gas and liquid impervious material and is sized and shaped to surround the sponges. The sponges are inserted in the tubing at spaced intervals. The encased sponges are inserted between the upper cell portions and the lower cell portions prior to joining the upper and lower cell portions. The tubing extends through the passageways. The sponges serve to prevent the cells from collapsing after either of gas and liquid is removed from the cells. The tube serves to prevent contamination of gas or liquid by the inner surfaces of the upper and lower cell portions.

In yet another, the sponges are impregnated with a zeolite compound.

In a final variant of the invention, the tube is formed from material selected from the group comprising: thermoplastic polyurethane elastomer, polyurethane polyvinyl chloride, polyvinyl chloride, and thermoplastic elastomer.

An apparatus for fabricating a flexible pressure vessel includes means for supporting first and second rolls of planar resilient material. First and second thermal die stamping stations are provided. The stamping stations are capable of forming upper and lower cell portions with attached passageway portions from said planar resilient material. Means are provided for moving the planar resilient material from the first and second rolls of planar resilient material into the first and second thermal die stamping stations.

A radio frequency welder is provided, the welder is capable of joining the upper cell portion to the lower cell portion to form cells with attached passageways. Means are provided for moving the upper and lower cell portions into the radio frequency welder. Means for fitting a series of first and second rings frictionally over the upper and lower cell portions and to surrounding outer perimeters of the cell portions.

Means for supporting first and second rolls of high-strength fiber impregnated blanket material are provided. Means are provided for attaching first and second portions of blankets material over the upper and lower cell portions. Means are provided for attaching a valve to the passageway of a cell.

In variant of the apparatus for fabricating a flexible pressure vessel, means are provided for inserting a series of cell-shaped sponges between the upper and lower cell portions. In still another variant, means for supporting first and second rolls of either heat-reflecting plastic film or metal foil are provided. Means are provided for attaching either heat-reflecting plastic film or metal foil to an outer surface of at least one of the upper cell portion and the lower cell portion.

In another variant, means are provided for moving the blanket material covered cells portions to a high pressure hoop and lock braiding machine for stitching. In yet another variant, a means are provided for inserting cell shaped sponges in a tube formed of flexible, gas and liquid impervious material and sized and shaped to surround said sponges, at spaced intervals. Means are provided for inserting the encased sponges between the upper cell portions and the lower cell portions prior to joining the upper and lower cell portions. The tube extends through the passageways.

In a final variant of the apparatus for fabricating a flexible pressure vessel means are provided for positioning an upper retaining plate to fit over the upper cell portion and surround an outer perimeter of said upper cell portion when covered by the first portion of blanket material. Means are provided for positioning a lower retaining plate to fit over the lower cell portion and surround an outer perimeter of said lower cell portion when covered by the second portion of blanket material.

Means are provided for producing a series of holes that penetrate the upper retaining plate between its outer circumference and a third inner circumference, the lower retaining plate between its outer circumference and a fourth inner circumference and the first portion of blanket material, the border of sheet material surrounding an outer perimeter of the upper cell portion, a border of sheet material surrounding an outer perimeter of the lower cell portion and the second portion of blanket material. The holes are outside of the outer circumference of the first and second rings. Means are provided for inserting and securing fastening means through the holes, thereby securing the upper and lower retaining plates to each other.

A method for fabricating a flexible pressure vessel includes the following steps: Providing first and second rolls of planar resilient material. Providing first and second thermal die stamping stations. Moving the first and second rolls of planar resilient material into the first and second thermal die stamping stations. Forming upper and lower cell portions with attached passageway portions from said planar resilient material in the first and second thermal die stamping stations.

Providing a radio frequency welder. Moving the first and second cell portions into the radio frequency welder. Joining the upper cell portion to the lower cell portion in the radio frequency welder to form cells with attached passageways. Providing first and second rings. Fitting the first ring frictionally around an outer perimeter of the upper cell portion and fitting the second ring frictionally around an outer perimeter of the lower cell portion.

Providing first and second rolls of high-strength fiber impregnated blanket material. Attaching first and second portions of blankets material over the upper and lower cell portions. Stitching through the first and second portions of blankets material and the resilient material surrounding the upper and lower cell portions. Providing a valve and attaching the valve to the passageway of the cell.

A variant of the method for fabricating a flexible pressure vessel includes the following additional steps: Providing a series of cell-shaped sponges impregnated with a zeolite compound. Inserting the cell-shaped sponges between the upper and lower cell portions prior to joining the upper and lower cell portions.

Another variant includes these steps: Providing first and second rolls of either heat-reflecting plastic film or metal foil. Attaching either heat-reflecting plastic film or metal foil to an outer surface of at least one of the upper cell portion and the lower cell portion prior to attaching the first and second portions of blankets material over the upper and lower cell portions.

Still another variant includes moving the blanketed material covered cell portions to a high pressure hoop and lock braiding machine prior to stitching through the first and second portions of blankets material and resilient material surrounding the upper and lower cell portions.

Yet a further variant of the method includes the following steps: Providing a series of cell shaped sponges. Providing a tube. The tube is formed of flexible, gas and liquid impervious material and is sized and shaped to surround the sponges. Providing means for inserting the sponges in the tube at spaced intervals. Providing means for inserting the encased sponges between the upper cell portions and the lower cell portions prior to joining the upper and lower cell portions. Extending the tube through the passageways.

In a final variant of the invention, the method for fabricating a flexible pressure vessel includes the following additional steps: Providing upper and lower retaining plates. Providing a series of holes. The holes penetrate the upper retaining plate between its outer circumference and a third inner circumference, the lower retaining plate between its outer circumference and a fourth inner circumference and the first portion of blanket material, a border of sheet material surrounding an outer perimeter of the upper cell portion, a border of sheet material surrounding an outer perimeter of the lower cell portion and the second portion of blanket material. The holes are outside of outer circumferences of the first and second rings respectively. Inserting and securing a series of fastening means through the holes, thereby securing the upper and lower retaining plates to each other.

In a final variant of the invention, the method for fabricating a flexible pressure vessel includes the following additional steps: Providing upper and lower retaining plates. Providing a series of holes. The holes penetrating the upper retaining plate between its outer circumference and the third inner circumference, the lower retaining plate between its outer circumference and the fourth inner circumference and the first blanket, the border of sheet material surrounding the outer perimeter of the upper cell portion, the border of sheet material surrounding the outer perimeter of the lower cell portion and the second blanket. The holes are outside of the outer circumference of the first and second rings. Inserting and securing a series of fastening means through the holes, thereby securing the upper and lower retaining plates to each other.

DESCRIPTION OF THE DRAWINGS

FIG. 1 is a plan view of a first embodiment of the invention illustrating diamond-shaped cells, connecting passageways and a valve;

FIG. 2 is a plan view of a second embodiment of the invention illustrating circular-shaped cells, connecting passageways and a valve;

FIG. 6 is a partial cross-sectional view of the FIG. 2 embodiment illustrating the radio frequency welding or high-strength adhesive used to join the cell portions;

FIG. 7 is a partial cross-sectional view of the FIG. 2 embodiment illustrating first and second blankets formed of high-strength fiber impregnated material;

FIG. 8 is a partial cross-sectional view of the FIG. 2 embodiment illustrating upper and lower retaining plates held in place by welded pins;

FIG. 9 is a plan view of the FIG. 2 embodiment with the addition of the upper and lower retaining plates;

FIG. 10 is a partial plan view of the cells and connecting passageways;

FIG. 11 is a perspective view of a first ring;

DETAILED DESCRIPTION OF THE PREFERRED EMBODIMENT

Figure 3:
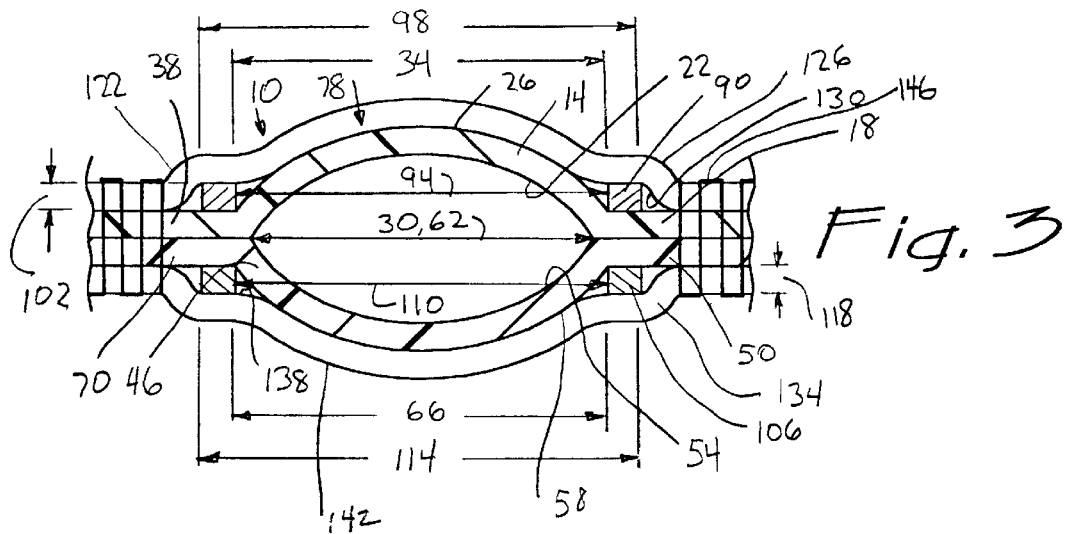
FIG. 3 is a partial cross-sectional view of the FIG. 2 embodiment illustrating the upper and lower cell portions, upper and lower rings, upper and lower blankets and reinforcing stitching.

FIGS. 1–3 illustrate a flexible pressure vessel 10 providing the desired features that may be constructed from the following components. At least one upper dome-shaped cell portion 14 is provided. The upper cell portion 14 is formed from a first sheet 18 of resilient material and has an inner surface 22, an outer surface 26, an inner perimeter 30, an outer perimeter 34, a border of sheet material 38 surrounding the outer perimeter 34, and at least one upper passageway portion 42. The upper passageway portion 42 extends outwardly from the inner perimeter 30 to the surrounding sheet material 38.

At least one mating lower dome-shaped cell portion 46 is provided. The lower cell portion 46 is formed from a second sheet 50 of resilient material and has an inner surface 54, an outer surface 58, an inner perimeter 62, an outer perimeter 66, a border of sheet material 70 surrounding the outer perimeter 66, and at least one lower passageway portion 74. The lower passageway portion 74 extends outwardly from the inner perimeter 62 to the surrounding sheet material 70. The upper cell portion 14 is joined to the mating lower cell portion 46 such that a cell 78 is formed. The cell 78 has at least one passageway 82 extending outwardly from the cell 78 for connection to either a passageway 82 of another cell 78 or a valve 86.

A first ring 90 is provided. The first ring 90 has an inner circumference 94, an outer circumference 98 and a first predetermined thickness 102. The first ring 90 is sized and shaped to fit frictionally over the upper cell portion 14 and surround its outer perimeter 34. A second ring 106 is provided. The second ring 106 has an inner circumference 110, an outer circumference 114 and a second predetermined thickness 118. The second ring 106 is sized and shaped to fit frictionally over the lower cell portion 46 and surround its outer perimeter 66.

A first flexible blanket 122 is provided. The first blanket 122 has an upper surface 126, a lower surface 130 and is sized and shaped to cover the upper cell portion 14 and surrounding sheet material 38. The first blanket 122 is fixedly attached at its lower surface 130 to the outer surface 26 of the upper cell portion 14 and surrounding sheet material 38. A second flexible blanket 134 is provided. The second blanket 134 has an upper surface 138, a lower surface 142 and is sized and shaped to cover the lower cell portion 46 and surrounding sheet material 70. The second blanket 134 is fixedly attached at its upper surface 138 to the outer surface 58 of the lower cell portion 46 and surrounding sheet material 70. A valve 86 is provided. The valve 86 is connected to the passageway 82 and provides means for controlling a flow of either of gasses and liquids into and out of the cell 78.

Figure 4:
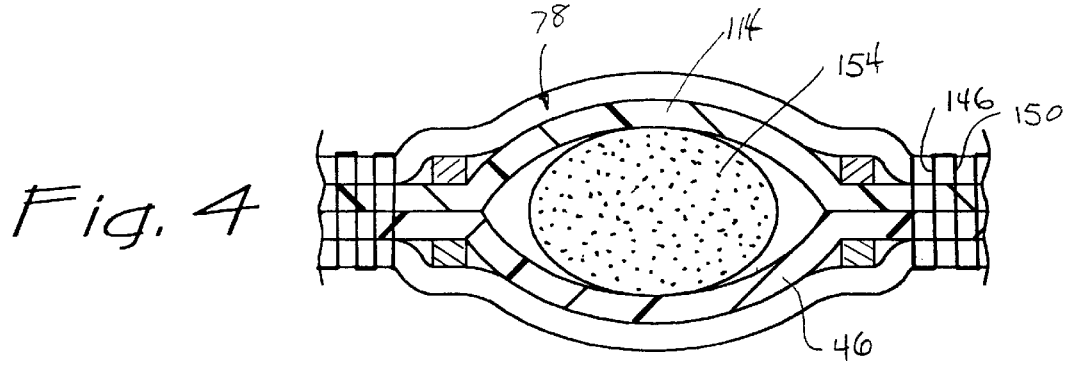
FIG. 4 is a partial cross-sectional view of the FIG. 2 embodiment illustrating the an included cell-shaped sponge.

In a variant of the invention, as illustrated in FIGS. 3 and 4, heavy duty stitching 146 is used to attach the first blanket 122 to the second blanket 134. The stitching 146 penetrates the first 122 and second 134 blankets and the first 18 and second 50 resilient sheets between the upper 14 and lower 46 cell portions and serves to prevent movement of the first 90 and second 106 rings with respect to the upper 14 and lower 46 cell portions.

In another variant, as illustrated in FIG. 4, the heavy duty stitching 146 is high-pressure hoop and lock braiding 150. In still another variant, also illustrated in FIG. 4, a cell-shaped sponge 154 is inserted between the upper cell portion 14 and the lower cell portion 46 prior to joining the upper 14 and lower 46 cell portions. The sponge 154 serves to prevent the cell 78 from collapsing after either of gas and liquid is removed from the cell 78. In yet another variant, the sponge 154 is impregnated with a zeolite compound.

Figure 5:
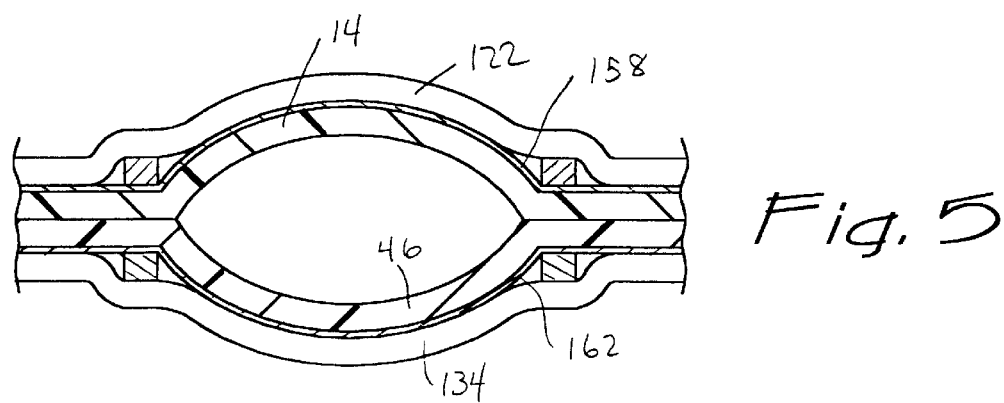
FIG. 5 is a partial cross-sectional view of the FIG. 2 embodiment illustrating a metal or foil layer surrounding the cell portions.

In yet a further variant of the invention, as illustrated in FIG. 5, either a heat-reflecting plastic film 158 or a metal foil 162 is inserted between at least one of the first blanket 122 and the upper cell portion 14 or the second blanket 134 and the lower cell portion 46.

In still a further variant, as illustrated in FIG. 6, the upper cell portion 14 is joined to the lower cell portion 46 by either radio frequency welding 166 or high strength adhesive 170. In another variant, as illustrated in FIG. 7, either of the first 122 and second 134 blankets is formed of high-strength fiber impregnated material 174. In still another variant the passageway 82 has a cross-section of between 0.050 and 0.100 inches.

In yet a further variant, as illustrated in FIGS. 8, 9, 12 and 13, the flexible pressure vessel 10 includes an upper retaining plate 250. The upper retaining plate 250 has a third inner circumference 254, an outer circumference 258 and a third predetermined thickness 262. The upper retaining plate 250 is sized and shaped to fit over the upper cell portion 14 and surround its outer perimeter 34 when the upper cell portion 14 is covered by the first blanket 122. The third inner circumference 254 is larger than the outer circumference 98 of the first ring 90.

A lower retaining plate 266 is provided. The lower retaining plate 266 has a fourth inner circumference 270, an outer circumference 274 and a fourth pre-determined thickness 278. The lower retaining plate 266 is sized and shaped to fit over the lower cell portion 46 and surround its outer perimeter 66 when the lower cell portion 46 is covered by the second blanket 134. The fourth inner circumference 270 is larger than the outer circumference 114 of the second ring 106. Means 282 are provided for attaching the upper retaining plate 250 to the lower retaining plate 266. When the upper retaining plate 250 is attached to the lower retaining plate 266, surrounding the upper 14 and lower 46 cell portions and the first 122 and second 134 blankets covering the first 90 and second 106 rings, the pressure capacity of the cell 78 will be increased.

In still a further variant of the invention, the means 282 for attaching the upper retaining plate 250 to the lower retaining plate 266 includes a series of holes 286. The holes 286 penetrate the upper retaining plate 250 between its outer circumference 258 and the third inner circumference 254, the lower retaining plate 266 between its outer circumference 278 and the fourth inner circumference 274 and the first blanket 122, the border of sheet material 38 surrounding the outer perimeter 34 of the upper cell portion 14, the border of sheet material 70 surrounding the outer perimeter 66 of the lower cell portion 46 and the second blanket 134. The holes 286 are outside of the outer circumference 98, 114 of the first 90 and second 106 rings.

Figure 12:
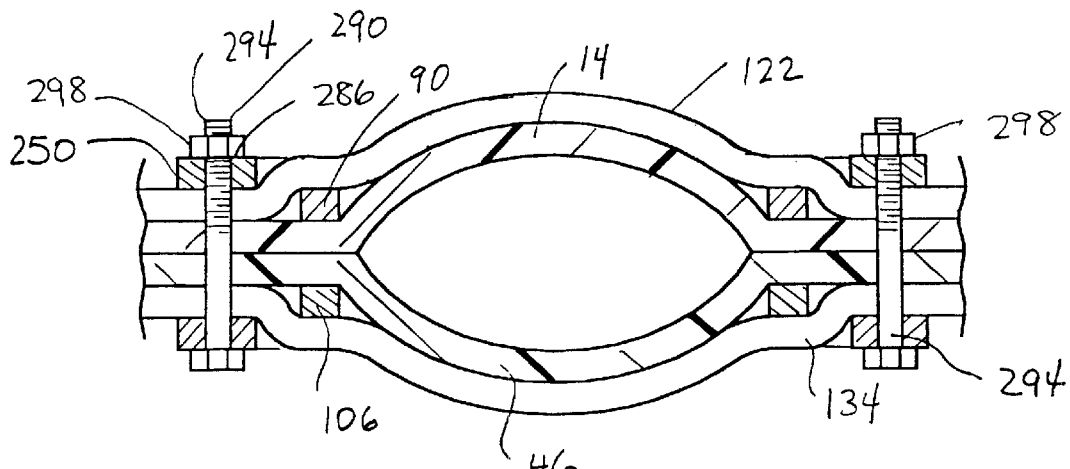
FIG. 12 is a partial cross-sectional view of the FIG. 2 embodiment illustrating upper and lower retaining plates held in place by nuts and bolts.
Figure 13:
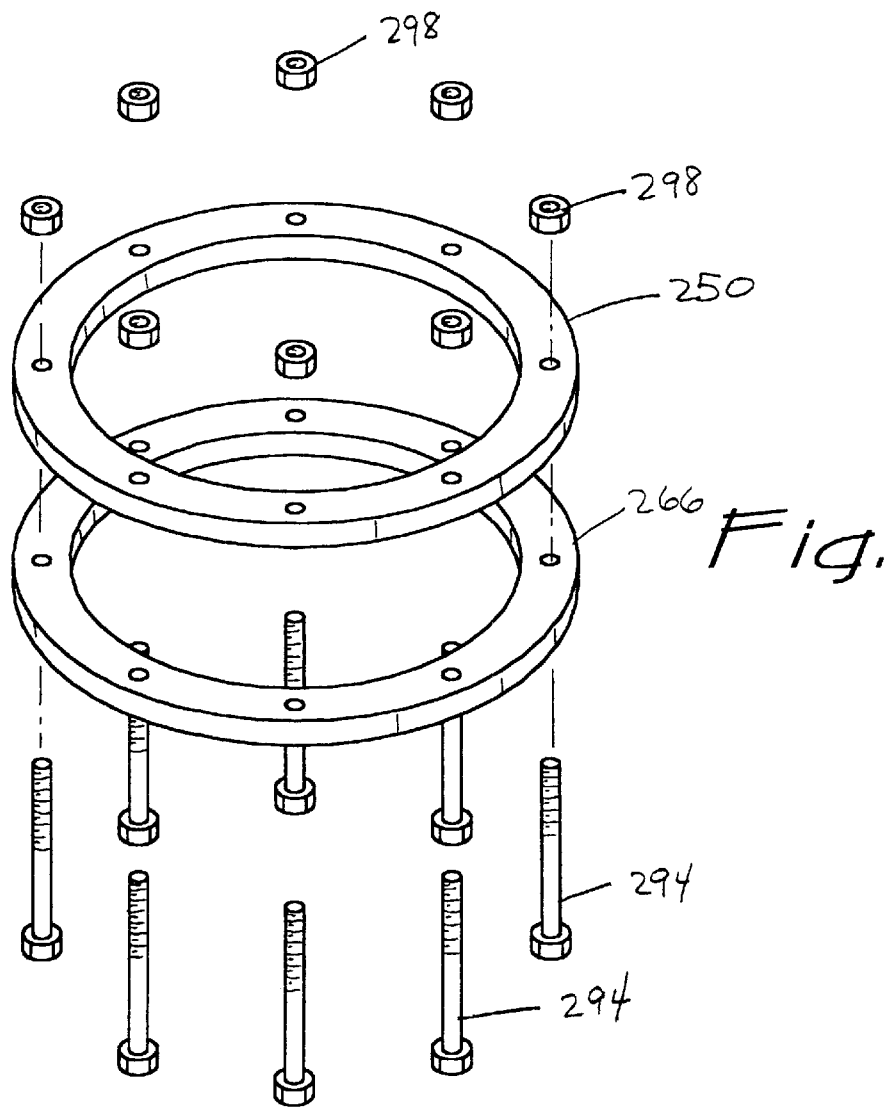
FIG. 13 is an exploded perspective view of the upper and lower retaining plates and fastening bolts.

A series of fastening means 290 are provided. The fastening means 290 are sized and shaped to pass through the series of holes 286 and capable of securing the upper retaining plate 250 to the lower retaining plate 266. In another variant, as illustrated in FIGS. 12 and 13, the fastening means 290 is a series of bolts 294 and locking nuts 298. In still another variant, the fastening means 290 is a series of rivets 302. (Figure needed)

In a further variant of the invention, as illustrated in FIG. 8, the means 282 for attaching the upper retaining plate 250 to the lower retaining plate 266 includes a series of holes 286. The holes 286 penetrate the upper retaining plate 250 between its outer circumference 258 and the third inner circumference 254, the first blanket 122, the border of sheet material 38 surrounding the outer perimeter 34 of the upper cell portion 14, the border of sheet material 70 surrounding the outer perimeter 66 of the lower cell portion 46 and the second blanket 134. The holes 286 are outside of the outer circumference 98, 114 of the first 90 and second rings 106.

A series of pins 306 is provided. The pins 306 are affixed orthogonally along an upper surface 310 of the lower retaining plate 266 and are sized, shaped and located to fit slidably through the series of holes 286 and extending slightly above an upper surface 314 of the upper retaining plate 250. A series of welds 318 are used to fixedly attach the pins 306 to the upper retaining plate 250, thereby securing the upper 250 and lower 266 retaining plates to each other.

Figure 15:
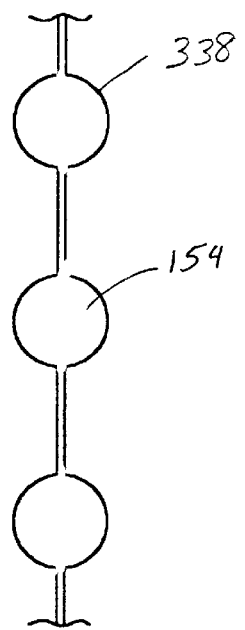
FIG. 15 is a plan view of the cell shaped sponges encased in an impermeable plastic tube.
Figure 16:
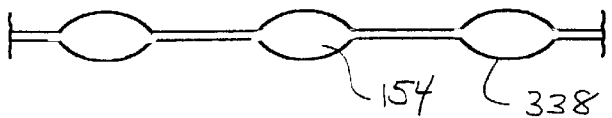
FIG. 16 is a side elevational view of the cell-shaped sponges encased in an impermeable plastic tube.
Figure 17:
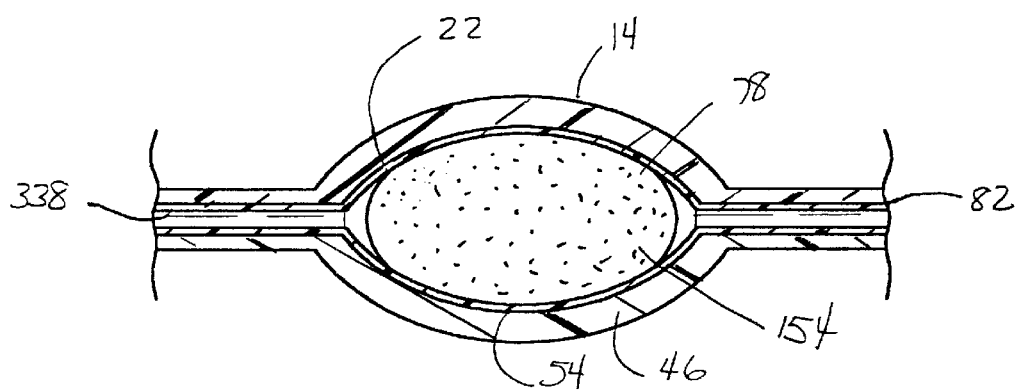
FIG. 17 is a partial cross-sectional view of the FIG. 2 embodiment illustrating the cell-shaped sponge encased in the impermeable plastic tube.

In still another variant, as illustrated in FIGS. 15–17, a series of cell shaped sponges 154 is provided. A tube 338 is provided. The tube 338 is formed of flexible, gas and liquid impervious material and is sized and shaped to surround the sponges 154. The sponges 154 are inserted in the tube 154 at spaced intervals. The encased sponges 154 are inserted between the upper cell portions 14 and the lower cell portions 46 prior to joining the upper 14 and lower 46 cell portions. The tube 338 extends through the passageways 82. The sponges 154 serve to prevent the cells 78 from collapsing after either of gas and liquid is removed from the cells 78. The tube 338 serves to prevent contamination of gas or liquid by the inner surfaces 22, 54 of the upper 14 and lower 46 cell portions.

In yet another variant, the sponges 154 are impregnated with a zeolite compound.

In a final variant of the invention, the tube 338 is formed from material selected from the group comprising: thermoplastic polyurethane elastomer, polyurethane polyvinyl chloride, polyvinyl chloride, and thermoplastic elastomer.

Figure 14:
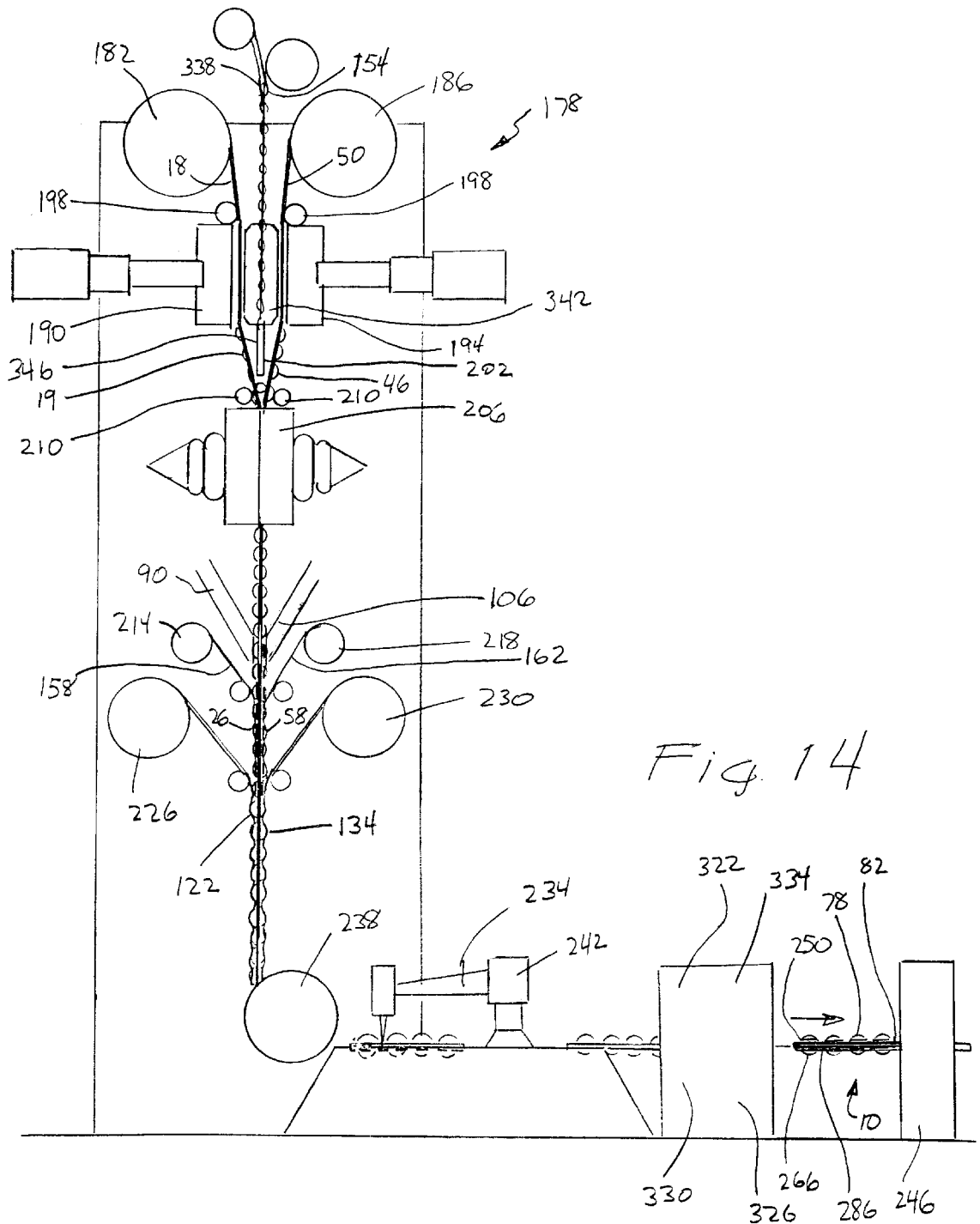
FIG. 14 is a schematic illustrating an apparatus for making the flexible pressure vessel.

An apparatus 178 for fabricating a flexible pressure vessel 10 as illustrated in FIG. 14, includes means for supporting first 182 and second 186 rolls of planar resilient material 18, 50. First 190 and second 194 thermal die stamping stations are provided. The stamping stations 190, 194 are capable of forming the upper 14, and lower 46 cell portions with attached passageway portions 42 from said planar resilient material 18, 50. Means 198 are provided for moving said planar resilient material 18, 50 from the first 182 and second 186 rolls of planar resilient material 18, 50 into the first 190 and second 194 thermal die stamping stations.

A radio frequency welder 206 is provided, the welder 206 is capable of joining the upper cell portion 14 to the lower cell portion 46 to form cells with attached passageways 82. Means 210 are provided for moving the upper 14 and lower 46 cell portions into the radio frequency welder 206. Means for fitting series of first 90 and second 106 rings frictionally over the upper cell portion 14 and lower cell portion 46 to surround outer perimeters 34, 66.

Means for supporting first 226 and second 230 rolls of high-strength fiber impregnated blanket material 174 are provided. Means 234 are provided for attaching first 122 and second 134 portions of blanket material over the upper 14 and lower 46 cell portions. Means 246 are provided for attaching a valve 86 to a passageway 82 of a cell 78.

In a variant of the apparatus 178 for fabricating a flexible pressure vessel 10, a series of cell-shaped sponges 154 are provided. Means 202 are provided for inserting a series of cell-shaped sponges 154 between the upper 14 and lower 46 cell portions prior to joining the upper 14 and lower 46 cell portions.

In another variant, means for supporting first 214 and second 218 rolls of either heat-reflecting plastic film 158 or metal foil 162 are provided. Means 222 are provided for attaching either heat-reflecting plastic film 158 or metal foil 162 to the outer surface 26, 58 of at least one of the upper cell portion 14 and the lower cell portion 46. In still another variant, means 238 are provided for moving the blanketed material covered cells portions 78 to a high pressure hoop and lock braiding machine 242 for stitching.

In yet another variant, as illustrated in FIGS. 14–17, means 342 are provided for inserting cell shaped sponges 154 in a tube 338 formed of flexible, gas and liquid impervious material and sized and shaped to surround said sponges 154, at spaced intervals. Means 346 are provided for inserting the encased sponges 154 between the upper cell portions 14 and the lower cell portions 46 prior to joining the upper 14 and lower 46 cell portions. The tube 338 extends through the passageways 82.

In a final variant of the apparatus 178 for fabricating a flexible pressure vessel 10 means 322 are provided for positioning an upper retaining plate 250 to fit over the upper cell portion 14 and surround an outer perimeter 34 of said upper cell portion 14 when covered by the first portion of blanket material 122. Means 326 are provided for positioning a lower retaining plate 266 to fit over the lower cell portion 46 and surround an outer perimeter 66 of said lower cell portion 46 when is covered by the second portion of blanket material 134.

Means 330 are provided for producing a series of holes 286 that penetrate the upper retaining plate 250 between its outer circumference 258 and a third inner circumference 254, the lower retaining plate 266 between its outer circumference 278 and a fourth inner circumference 274 and the first portion of blanket material 122, a border of sheet material 38 surrounding an outer perimeter 34 of the upper cell portion 14, a border of sheet material 70 surrounding an outer perimeter 66 of the lower cell portion 46 and the second portion of blanket material 134. The holes 286 are outside of the outer circumference 98, 114 of the first 90 and second 106 rings. Means 334 are provided for inserting and securing fastening means 290 through the holes 286, thereby securing the upper 250 and lower 266 retaining plates to each other.

The flexible pressure vessel 10 and apparatus 178 and method for making same have been described with reference to particular embodiments. Other modifications and enhancements can be made without departing from the spirit and scope of the claims that follow.

What is claimed is:

1. A flexible pressure vessel, comprising:
    at least one upper dome-shaped cell portion, said upper cell portion being formed from a first sheet of resilient material and having an inner surface, an outer surface, an inner perimeter, an outer perimeter, a border of sheet material surrounding said outer perimeter, and at least one upper passageway portion, said upper passageway portion extending outwardly from said inner perimeter to said surrounding sheet material;
    at least one mating lower dome-shaped cell portion, said lower cell portion being formed from a second sheet of resilient material and having an inner surface, an outer surface, an inner perimeter, an outer perimeter, a border of sheet material surrounding said outer perimeter, and at least one lower passageway portion, said lower passageway portion extending outwardly from said inner perimeter to said surrounding sheet material;
    said upper cell portion being joined to said mating lower cell portion such that a cell is formed, said cell having at least one passageway extending outwardly from said cell for connection to either of a passageway of another cell and a valve;
    a first ring, said first ring having a first inner circumference, an outer circumference and a first pre-determined thickness;
    said first ring being sized and shaped to fit frictionally over the upper cell portion and surround its outer perimeter;
    a second ring, said second ring having a second inner circumference, an outer circumference and a second predetermined thickness;
    said second ring being sized and shaped to fit frictionally over the lower cell portion and surround its outer perimeter;
    a first flexible blanket, said first blanket having an upper surface, a lower surface and being sized and shaped to cover said upper cell portion and surrounding sheet material;
    said first blanket being fixedly attached at its lower surface to the outer surface of said upper cell portion and surrounding sheet material;
    a second flexible blanket, said second blanket having an upper surface, a lower surface and being sized and shaped to cover said lower cell portion and surrounding sheet material;
    said second blanket being fixedly attached at its upper surface to the outer surface of said lower cell portion and surrounding sheet material; and
    a valve, said valve being connected to said passageway and providing means for controlling a flow of either of gasses and liquids into and out of the cell.

2. A flexible pressure vessel as described in claim 1, wherein heavy duty stitching is used to attach the first blanket to the second blanket, said stitching penetrating the first and second blankets and the first and second resilient sheets between the upper and lower cell portions and serving to prevent movement of the first and second rings with respect to the upper and lower cell portions.

3. A flexible pressure vessel as described in claim 2, wherein the heavy duty stitching is high pressure hoop and lock braiding.

4. A flexible pressure vessel as described in claim 1, wherein a cell-shaped sponge is inserted between the upper cell portion and the lower cell portion prior to joining said upper and lower cell portions, said sponge serving to prevent said cell from collapsing after either of gas and liquid is removed from the cell.

5. A flexible pressure vessel as described in claim 4, wherein the sponge is impregnated with a zeolite compound.

6. A flexible pressure vessel as described in claim 1, wherein either of a heat-reflecting plastic film and a metal foil is inserted between at least one of the first blanket and the upper cell portion and the second blanket and the lower cell portion.

7. A flexible pressure vessel as described in claim 1, wherein the upper cell portion is joined to the lower cell portion by either of radio frequency welding and high strength adhesive.

8. A flexible pressure vessel as described in claim 1, wherein either of the first and second blankets is formed of high-strength fiber impregnated material.

9. A flexible pressure vessel as described in claim 1, wherein the passageway has a cross-section of between 0.050 and 0.100 inches.

10. A flexible pressure vessel as described in claim 1, further comprising:
    an upper retaining plate, said upper retaining plate having a third inner circumference, an outer circumference and a third pre-determined thickness;
    said upper retaining plate being sized and shaped to fit over the upper cell portion and surround its outer perimeter when said upper cell portion is covered by said first blanket;
    said third inner circumference being larger than the outer circumference of said first ring;
    a lower retaining plate, said lower retaining plate having a fourth inner circumference, an outer circumference and a fourth pre-determined thickness;
    said lower retaining plate being sized and shaped to fit over the lower cell portion and surround its outer perimeter when said lower cell portion is covered by said second blanket;
    said fourth inner circumference being larger than the outer circumference of said second ring;
    means for attaching said upper retaining plate to said lower retaining plate; and
    whereby, when the upper retaining plate is attached to the lower retaining plate, surrounding the upper and lower cell portions and the first and second blankets covering the first and second rings, the pressure capacity of the cell will be increased.

11. A flexible pressure vessel as described in claim 10, wherein the means for attaching the upper retaining plate to the lower retaining plate further comprises:

a series of holes, said holes penetrating said upper retaining plate between its outer circumference and said third inner circumference, said lower retaining plate between its outer circumference and said fourth inner circumference and said first blanket, the border of sheet material surrounding the outer perimeter of the upper cell portion, the border of sheet material surrounding the outer perimeter of the lower cell portion and the second blanket;

said holes being outside of the outer circumference of said first and second rings;

a series of fastening means, said fastening means being sized and shaped to pass through said series of holes and capable of securing said upper retaining plate to said lower retaining plate.

12. A flexible pressure vessel as described in claim 11, wherein the fastening means is a series of bolt and locking nuts.

13. A flexible pressure vessel as described in claim 11, wherein the fastening means is a series of rivets.

14. A flexible pressure vessel as described in claim 10, wherein the means for attaching the upper retaining plate to the lower retaining plate further comprises:

a series of holes, said holes penetrating said upper retaining plate between its outer circumference and said third inner circumference, said first blanket, the border of sheet material surrounding the outer perimeter of the upper cell portion, the border of sheet material surrounding the outer perimeter of the lower cell portion and the second blanket;

said holes being outside of the outer circumference of said first and second rings;

a series of pins, said pins being affixed orthogonally along an upper surface of said lower retaining plate and being sized, shaped and disposed to fit slidably through said series of holes and extending slightly above an upper surface of said upper retaining plate; and a series of welds, said welds fixedly attaching said pins to said upper retaining plate, thereby securing said upper and lower retaining plates to each other.

15. A flexible pressure vessel as described in claim 1, further comprising:

a series of cell shaped sponges;

a tube, said tube being formed of flexible, gas and liquid impervious material and being sized and shaped to surround said sponges;

said sponges being inserted in said tube at spaced intervals, the encased sponges being inserted between the upper cell portions and the lower cell portions prior to joining said upper and lower cell portions, said tube extending through said passageways;

said sponges serving to prevent said cells from collapsing after either of gas and liquid is removed from the cells; and said tube serving to prevent contamination of either of gas and liquid by the inner surfaces of the upper and lower cell portions.

16. A flexible pressure vessel as described in claim 15, wherein the sponge is impregnated with a zeolite compound.

17. A flexible pressure vessel as described in claim 15, wherein the tube is formed from material selected from the group comprising:

thermoplastic polyurethane elastomer, polyurethane polyvinyl chloride, polyvinyl chloride, thermoplastic elastomer.

18. An apparatus for fabricating a flexible pressure vessel, comprising:

means for supporting first and second rolls of planar resilient material;

first and second thermal die stamping stations, said stamping stations being capable of forming upper and lower cell portions with attached passageway portions from said planar resilient material;

means for moving said planar resilient material from said first and second rolls of planar resilient material into said first and second thermal die stamping stations;

a radio frequency welder, said welder being capable of joining the upper cell portion to the lower cell portion to form cells with attached passageways;

means for moving the upper and lower cell portions into the radio frequency welder;

means for fitting a plurality of first and second rings frictionally over the upper and lower cell portions and surrounding outer perimeters of said cell portions means for supporting first and second rolls of high-strength fiber impregnated blanket material;

means for attaching first and second portions of blankets material over the upper and lower cell portions; and means for attaching a valve to the passageway of a cell.

19. An apparatus for fabricating a flexible pressure vessel, as described in claim 18, further comprising:

means for inserting a series of cell-shaped sponges between the upper and lower cell portions prior to joining said upper and lower cell portions.

20. An apparatus for fabricating a flexible pressure vessel, as described in claim 18, further comprising:

means for supporting first and second rolls of either of heat-reflecting plastic film and metal foil; and means for attaching either of heat-reflecting plastic film and metal foil to an outer surface of at least one of the upper cell portion and the lower cell portion.

21. An apparatus for fabricating a flexible pressure vessel, as described in claim 18, further comprising means for moving the blanketed material covered cells portions to a high-pressure hoop and lock braiding machine.

22. An apparatus for fabricating a flexible pressure vessel, as described in claim 18, further comprising:

means for inserting cell shaped sponges in a tube formed of flexible, gas and liquid impervious material and sized and shaped to surround said sponges, at spaced intervals; and means for inserting said encased sponges between the upper cell portions and the lower cell portions prior to joining said upper and lower cell portions, said tube extending through said passageways.

23. An apparatus for fabricating a flexible pressure vessel, as described in claim 18, further comprising:

means for positioning an upper retaining plate to fit over the upper cell portion and surround an outer perimeter of said upper cell portion when covered by said first portion of blanket material;

means for positioning a lower retaining plate to fit over the lower cell portion and surround an outer perimeter of said lower cell portion when covered by said second portion of blanket material;

means for producing a series of holes, said holes penetrating said upper retaining plate between its outer circumference and a third inner circumference, said lower retaining plate between its outer circumference and a fourth inner circumference and said first portion of blanket material, border of sheet material surrounding an outer perimeter of the upper cell portion, a border of sheet material surrounding an outer perimeter of the lower cell portion and said second portion of blanket material;

said holes being outside of the outer circumference of said first and second rings; and means for inserting and securing fastening means through said holes, thereby securing said upper and lower retaining plates to each other.

24. A method for fabricating a flexible pressure vessel, comprising:

providing first and second rolls of planar resilient material;

providing first and second thermal die stamping stations;

moving said first and second rolls of planar resilient material into said first and second thermal die stamping stations;

forming upper and lower cell portions with attached passageway portions from said planar resilient material in said first and second thermal die stamping stations;

providing a radio frequency welder;

moving the first and second cell portions into the radio frequency welder;

joining the upper cell portion to the lower cell portion in the radio frequency welder to form cells with attached passageways;

providing first and second rings;

fitting said first ring frictionally around an outer perimeter of the upper cell portion and fitting said second ring frictionally around an outer perimeter of the lower cell portion;

providing first and second rolls of high-strength fiber impregnated blanket material;

attaching first and second portions of blankets material over the upper and lower cell portions;

stitching through the first and second portions of blanket material and resilient material surrounding the upper and lower cell portions;

providing a valve;

attaching said valve to said passageway of said cell.

25. A method for fabricating a flexible pressure vessel as described in claim 24, further comprising:

providing a series of cell-shaped sponges; and inserting said cell-shaped sponges between the upper and lower cell portions prior to joining said upper and lower cell portions.

26. A method for fabricating a flexible pressure vessel as described in claim 24, further comprising:

providing first and second rolls of either of heat-reflecting plastic film and metal foil; and attaching either of heat-reflecting plastic film and metal foil to an outer surface of at least one of the upper cell portion and the lower cell portion prior to attaching the first and second portions of blankets material over the upper and lower cell portions.

27. A method for fabricating a flexible pressure vessel as described in claim 24, further comprising moving the blanketed material covered cells portions to a high pressure hoop and lock braiding machine prior to stitching through the first and second portions of blankets material and resilient material surrounding the upper and lower cell portions.

28. A method for fabricating a flexible pressure vessel as described in claim 24, further comprising:

providing a series of cell shaped sponges;

providing a tube, said tube being formed of flexible, gas and liquid impervious material and being sized and shaped to surround said sponges;

inserting said sponges in said tubing at spaced intervals;

inserting the encased sponges between the upper cell portions and the lower cell portions prior to joining said upper and lower cell portions, said tubing extending through said passageways.

29. A method for fabricating a flexible pressure vessel as described in claim 24, further comprising:

providing upper and lower retaining plates;

providing a series of holes, said holes penetrating said upper retaining plate between its outer circumference and a third inner circumference, said lower retaining plate between its outer circumference and a fourth inner circumference and said first portion of blanket material a border of sheet material surrounding an outer perimeter of the upper cell portion, a border of sheet material surrounding an outer perimeter of the lower cell portion and the second portion of blanket material;

said holes being outside of outer circumferences of said first and second rings respectively; and inserting and securing a series of fastening means through said holes, thereby securing said upper and lower retaining plates to each other.

* * * * *